UNITED STATES PATENT OFFICE.

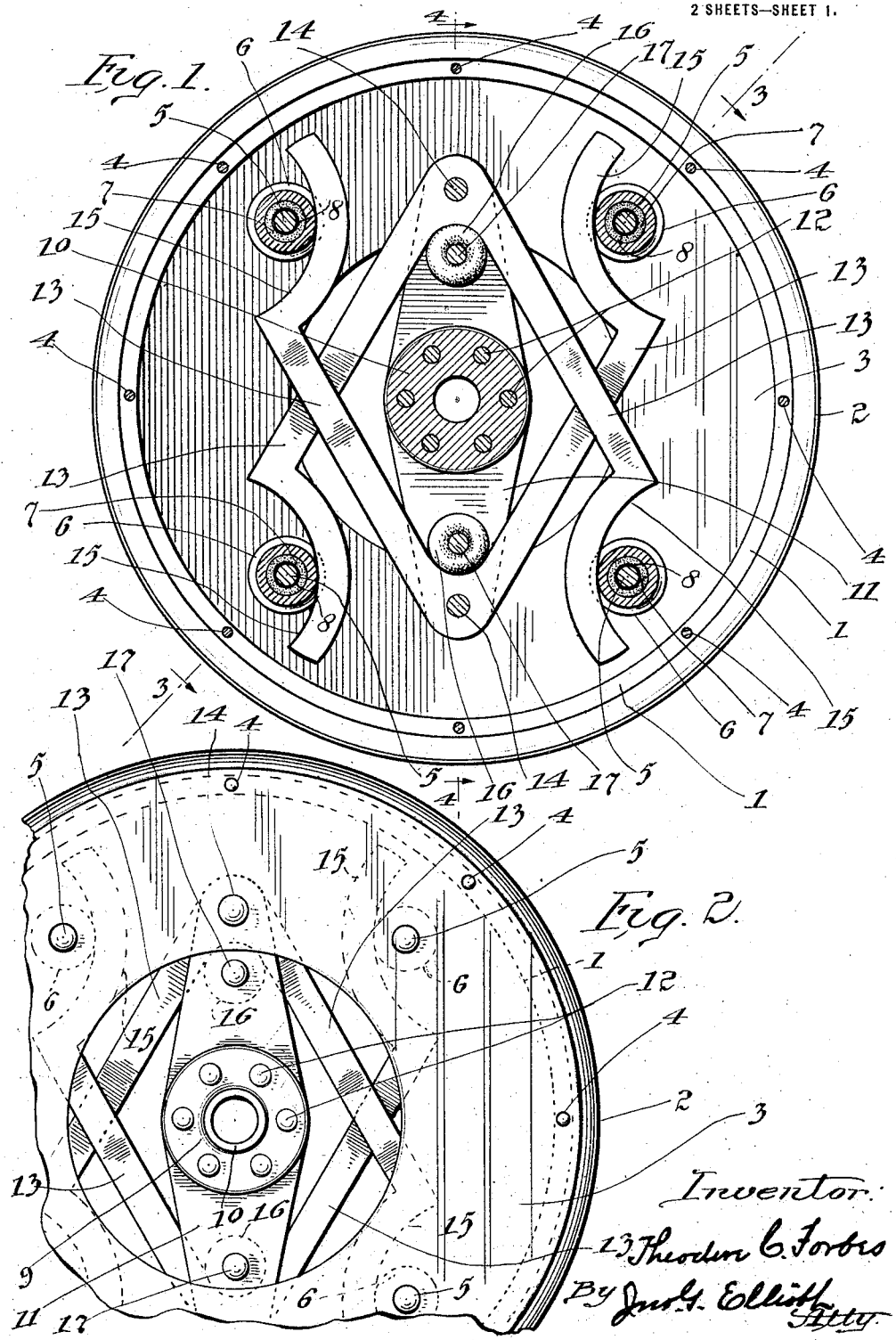

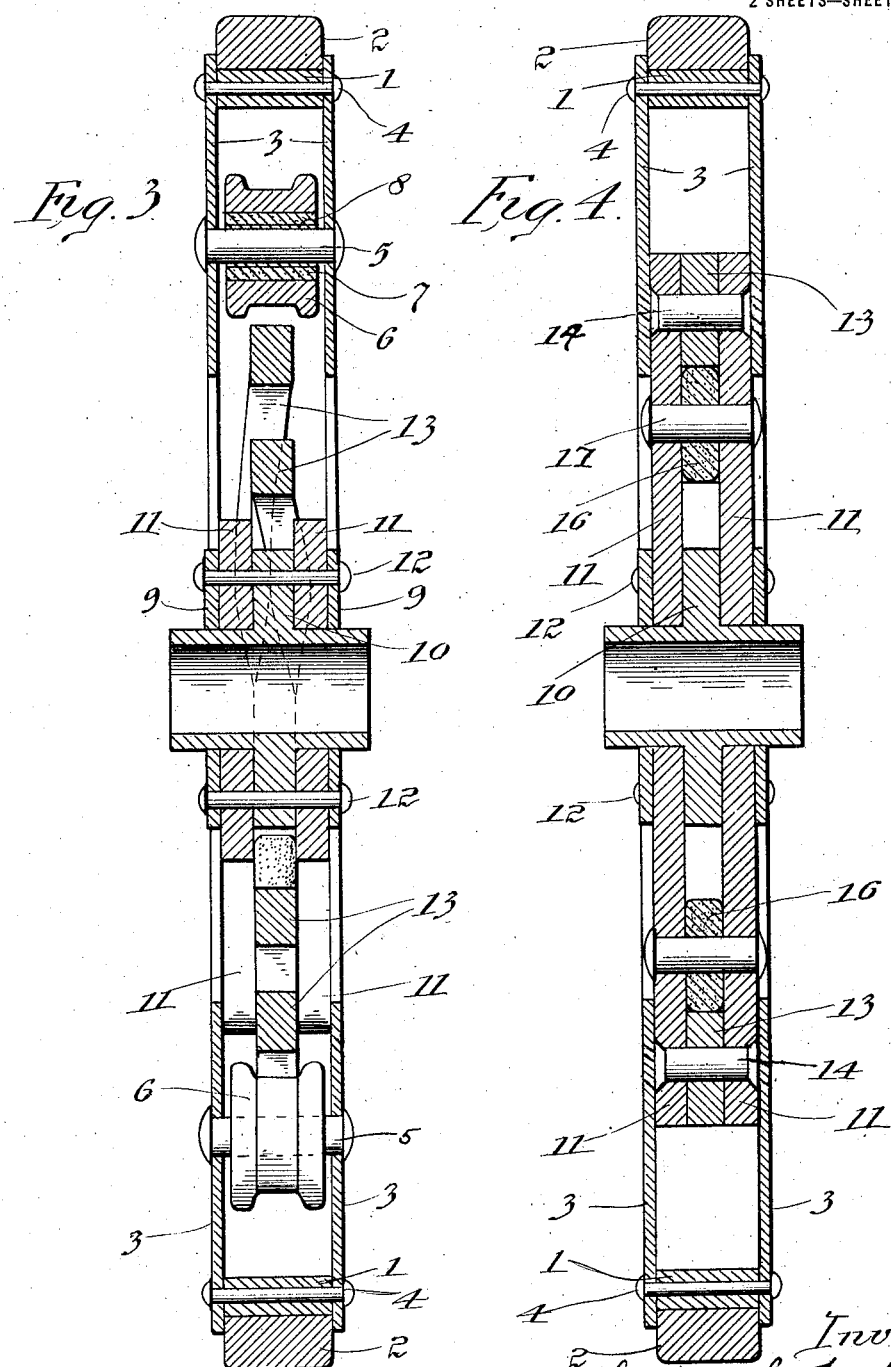

THEODORE C. FORBES, OF CHICAGO, ILLINOIS.

RESILIENT WHEEL.

1,391,729.  Specification of Letters Patent.  Patented Sept. 27, 1921.

Aplication filed June 28, 1919. Serial No. 307,323.

*To all whom it may concern:*

Be it known that I, THEODORE C. FORBES, a citizen of the United States, and resident of Chicago, in the county of Cook and State of Illinois, have invented certain new and useful Improvements in Resilient Wheels, of which the following is a full, clear, and exact specification.

My invention relates to resilient wheels and more particularly to such wheels designed and adapted for use upon automobiles, an object being to provide the necessary elasticity or resiliency without employing pneumatic tires.

A further object of my invention is to provide yieldable members of such a construction and arrangement in a wheel as to produce the desired elasticity without noise and vibration.

A further object is to provide inclosed pivoted members in a wheel and yieldable members coöperating therewith in such a manner as to furnish adequate strength for any ordinary load carried by the wheel.

And a further object is to provide yieldingly movable parts in a wheel and suitable inclosures therefor for preventing the entrance of dust and other foreign particles and for adding to the appearance of the wheel.

Other objects will appear hereinafter.

With these objects in view my invention finds embodiment in certain features of novelty in the construction, combination and arrangement of parts, by which said objects and certain other objects are attained, all as hereinafter described with reference to the accompanying drawings and more particularly pointed out in the appended claims.

In said drawings:

Figure 1 is a sectional view showing the interior construction of the wheel, one of the side plates employed therefor being removed to expose said construction.

Fig. 2 is a fragmentary view illustrating the wheel in side elevation.

Fig. 3 is a central transverse section taken on line 3—3 of Fig. 1, and

Fig. 4 is also a central transverse section taken on line 4—4 of Fig. 1.

The preferred form of construction as shown in the accompanying drawings comprises a circular metallic rim 1 surrounded by a tread portion or tire 2, as shown in Figs. 1 and 2. Secured to the opposing lateral edges of rim 1 are annular cover or side plates 3, the preferred securing means consisting of rivets 4 which extend through said rim and plates for producing a rigid assembly. In order to furnish a suitable connection of plates 3 with movable members in the wheel, to be presently described, a plurality of journals 5 extend from one of said plates to the other and are rigidly secured thereto, as shown in Figs. 3 and 4. Mounted to rotate freely on journals 5 are flanged rollers 6 which are provided with resilient cores 7 composed of any suitable yieldable material such as rubber or felt. In order to provide a suitable bearing for rollers 5 thin metallic bushings 8 are inserted in cores 7, as shown in Fig. 1. From this construction it will be seen that rollers 6 are free to rotate without appreciable friction and are capable of yielding to a limited extent when subjected to heavy loads.

The wheel hub is composed of circular exterior plates 9 and a central or body member 10, a pair of diametric bars 11 being secured to said body member by means of a plurality of rivets 12, thus securing a rigid construction.

It will be noted that bars 11 are arranged parallel to each other and that their edges converge toward their outer extremities. A pair of substantially V-shaped movable members 13 are interposed between the extremities of bars 11 and are pivoted thereto by means of pivotal rivets 14, the latter being secured rigidly in said bars and of such a size as to permit members 13 to oscillate freely thereon.

The free extremities of members 13 are formed into arcuate roll-ways for coöperation with rollers 6 as clearly illustrated in Fig. 1.

Yieldable cushion members 16 are arranged within the vertices of members 13 and secured to bars 11 by means of rivets 17 in such a manner as to preclude the possibility of noise or vibration in case of undue wear in the pivotal connections of members 13 with bars 11. Cushions 16 are annular in form and are preferably of elastic material such as rubber, in order to materially assist the yieldable rollers 6 in overcoming shocks and vibration to which the tread of the wheel is subjected.

The operation of the movable parts in the wheel is as follows: Assuming that the normal position of the parts is as shown in Fig. 1, then when a load is supported by the wheel hub, roll-ways 15 will move downward slightly on rollers 6, such movement being limited however by the curvature of said roll-ways, which virtually act as wedges and compress the yieldable cores 7 in said rollers. Assuming that a driving torque is imposed upon the wheel, then cushions 16 will resist the turning action of members 13 on pivots 14, the coöperation of the several parts being such as to resume their normal positions, as shown in Fig. 1, when relieved of heavy loads or driving torque. It will be observed that the flanges of rollers 6 project over the lateral surfaces of members 13 in such a manner as to prevent accidental disengagement therewith.

While the portions of members 13 engaging rollers 6 and pivoted to bars 11 are in the same plane, said plates are bent intermediate their ends sufficiently to pass each other and to prevent abrasion and consequent noise and vibration.

And while I have shown the preferred form of construction for carrying my invention into effect, there might be various changes and modifications without departing from the spirit of the invention. I, therefore, do not wish to be limited to the precise details of construction set forth, but desire to avail myself of such variations and modifications as come within the scope of the appended claims.

Having thus described my invention what I claim and desire to secure by Letters Patent is:

1. In a resilient wheel, the combination of a hub and a rim arranged normally concentrically therewith, pivots disposed on opposite sides of said hub, and a pair of open end substantially V-shaped members mounted to oscillate at their apices on said pivots and yieldably connected at their free ends with said rim.

2. A resilient wheel comprising a rim and a tire thereon, annular side plates secured to the lateral edges of said rim, a hub and a diametric bar secured thereto, a substantially V-shaped member pivoted at the vertex thereof to each extremity of said bar, and yieldable means for connecting the free ends of said members with said plates.

3. A resilient wheel comprising in combination, a hub and a pair of diametric parallel bars secured thereto, pivots arranged at the ends of said bars, a rim and annular side plates secured thereto, rollers interposed between and journaled to said plates, and substantially V-shaped members arranged to oscillate at their vertices on said pivots and to slide at their extremities on said rollers.

4. A resilient wheel comprising a hub and radial arms extending therefrom in opposite directions, a rim and annular side plates therefor surrounding said hub, rollers journaled to said plates, substantially V-shaped members pivoted at their apices between the extremities of said arms, and arcuate roll-ways constituting the ends of said members for coöperation with said rollers.

5. A resilient wheel comprising a hub and a pair of reversely disposed substantially V-shaped members having arcuate extremities the apices of which members are pivoted at diametrically opposite points relative to said hub, a rim and annular side plates therefor inclosing said arcuate extremities, and rollers journaled to said side plates for coöperation with said extremities.

6. A resilient wheel comprising a rim and annular side plates secured thereto, rollers journaled between said plates, a hub and diametrically opposed pivots in rigid relation therewith, a pair of reversely disposed substantially V-shaped members connected at their apices to said pivots for oscillation thereon, and arcuate roll-ways formed on the free extremities of said members for producing a wedging action between said rollers.

7. A resilient wheel comprising a hub and a pair of reversely disposed substantially V-shaped members having arcuate extremities the apices of which members are pivoted at diametrically opposite points relative to said hub, a rim and annular side plates therefor inclosing said arcuate extremities, and yieldable rollers journaled to said side plates for coöperation with said extremities.

8. A resilient wheel comprising a rim and annular side plates secured thereto, a plurality of rollers interposed between said side plates and adapted to rotate on axes parallel to the axis of said rim, a hub and diametrically opposed pivots in rigid relation therewith, a pair of reversely disposed substantially V-shaped members arranged to oscillate on said pivots and to coöperate with said rollers, and cushions arranged at the juncture of the arms of said members and in rigid relation with said hub.

9. A resilient wheel comprising a rim and a tire surrounding the same, annular plates arranged in opposite sides of said rim and removably bolted thereto, a plurality of equally spaced rollers interposed between said plates, journals secured to said plates passing through said rollers, a bearing bushing and a yieldable core provided for each roller, a hub and a pair of radial arms extending therefrom in opposite directions, a substantially V-shaped member having arcuate extremities arranged between each pair of arms and pivoted thereto, said extremities being arranged for coöperation with said rollers, and resilient means for resisting oscillation of said members on said pivots.

In witness whereof, I have hereunto set my hand and affixed my seal this 26th day of June, A. D. 1919.

THEODORE C. FORBES. [L. S.]

Witnesses:
 JOHN H. McELROY,
 JNO. G. ELLIOTT.